US011016946B1

(12) United States Patent
Graham et al.

(10) Patent No.: US 11,016,946 B1
(45) Date of Patent: May 25, 2021

(54) METHOD AND APPARATUS FOR PROCESSING OBJECT METADATA

(71) Applicant: EMC Corporation, Hopkinton, MA (US)

(72) Inventors: Stephen G. Graham, Chapel Hill, NC (US); Eron D. Wright, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 404 days.

(21) Appl. No.: 14/674,314

(22) Filed: Mar. 31, 2015

(51) Int. Cl.
  *G06F 16/182* (2019.01)
  *G06F 16/951* (2019.01)

(52) U.S. Cl.
  CPC ......... *G06F 16/182* (2019.01); *G06F 16/951* (2019.01)

(58) Field of Classification Search
  CPC ......... G06F 17/30194; G06F 17/30864; G06F 16/951; G06F 16/182
  USPC ..................................................... 707/737
  See application file for complete search history.

(56) References Cited

U.S. PATENT DOCUMENTS

| | | | | |
|---|---|---|---|---|
| 6,959,326 B1* | 10/2005 | Day | ............ | G06F 16/951 709/217 |
| 7,792,868 B2* | 9/2010 | Finkelstein | ............ | G06F 16/954 707/798 |
| 8,375,047 B2* | 2/2013 | Narayanan | ........ | G06F 16/24549 707/764 |
| 8,484,259 B1* | 7/2013 | Makkar | ............ | G06F 16/90335 707/827 |
| 8,805,971 B1* | 8/2014 | Roth | ............ | G06F 9/5072 709/220 |
| 8,812,450 B1* | 8/2014 | Kesavan | ............ | G06F 16/17 707/656 |
| 9,026,499 B1* | 5/2015 | Rajimwale | ............ | G06F 16/972 707/674 |
| 9,052,942 B1* | 6/2015 | Barber | ............ | G06F 3/0604 |
| 9,141,658 B1* | 9/2015 | Nair | ............ | G06F 16/353 |
| 9,396,290 B2* | 7/2016 | Ogasawara | ............ | G06F 16/282 |
| 9,454,573 B1* | 9/2016 | Welton | ............ | G06F 16/27 |
| 9,558,194 B1* | 1/2017 | Srivastav | ............ | G06F 16/1794 |
| 10,659,523 B1* | 5/2020 | Joseph | ............ | H04L 63/0209 |
| 2003/0172059 A1* | 9/2003 | Andrei | ............ | G06F 16/24554 |
| 2004/0098371 A1* | 5/2004 | Bayliss | ............ | G06F 16/2471 |
| 2005/0021563 A1* | 1/2005 | Shaburov | ............ | G06F 40/123 |
| 2005/0055326 A1* | 3/2005 | Thusoo | ............ | G06F 16/93 |

(Continued)

OTHER PUBLICATIONS

U.S. Office Action dated Nov. 30, 2016 corresponding to U.S. Appl. No. 14/501,891; 12 Pages.

(Continued)

*Primary Examiner* — Ashish Thomas
*Assistant Examiner* — Nargis Sultana
(74) *Attorney, Agent, or Firm* — Daly, Crowley Mofford & Durkee, LLP

(57) ABSTRACT

A distributed object store can expose object metadata, in addition to object data, to distributed processing systems, such as Hadoop and Apache Spark. The distributed object store may acts as a Hadoop Compatible File System (HCFS), exposing object metadata as a collection of records that can be efficiently processed by MapReduce (MR) and other distributed processing frameworks. Various metadata records formats are supported. Related methods are also described.

19 Claims, 6 Drawing Sheets

(56) References Cited

U.S. PATENT DOCUMENTS

| | | | | |
|---|---|---|---|---|
| 2005/0188349 | A1* | 8/2005 | Bent | G06F 8/38 717/106 |
| 2006/0277170 | A1* | 12/2006 | Watry | G06F 16/8358 |
| 2007/0192352 | A1* | 8/2007 | Levy | G06F 16/80 |
| 2008/0021921 | A1* | 1/2008 | Horn | G06F 3/0485 |
| 2008/0115083 | A1* | 5/2008 | Finkelstein | G06F 16/00 715/805 |
| 2009/0187573 | A1* | 7/2009 | Johnston | G06F 8/10 |
| 2010/0106672 | A1* | 4/2010 | Robson | G06F 16/907 706/50 |
| 2011/0072006 | A1* | 3/2011 | Yu | G06F 16/24535 707/718 |
| 2011/0145210 | A1* | 6/2011 | Rathinam | G06F 16/907 707/705 |
| 2011/0153594 | A1* | 6/2011 | Hagenbuch | G06F 11/0778 707/718 |
| 2011/0153606 | A1* | 6/2011 | Kim | G06F 16/1827 707/737 |
| 2011/0258225 | A1* | 10/2011 | Taylor | G06F 16/2272 707/769 |
| 2011/0302583 | A1* | 12/2011 | Abadi | G06F 16/2471 718/102 |
| 2012/0016901 | A1* | 1/2012 | Agarwal | G06F 16/258 707/769 |
| 2012/0150836 | A1* | 6/2012 | He | G06F 16/951 707/708 |
| 2012/0166487 | A1* | 6/2012 | Stougie | G06F 11/1076 707/792 |
| 2012/0198042 | A1* | 8/2012 | Dunbar | H04N 21/2181 709/223 |
| 2012/0210342 | A1* | 8/2012 | Gonzalez | H04N 21/4532 725/25 |
| 2012/0221558 | A1* | 8/2012 | Byrne | G06F 17/30864 707/723 |
| 2012/0221571 | A1* | 8/2012 | Orman | G06F 16/90324 707/737 |
| 2012/0254174 | A1* | 10/2012 | Mitra | G06F 16/1752 707/737 |
| 2013/0007062 | A1* | 1/2013 | Dutta | G06F 16/176 707/792 |
| 2013/0041872 | A1* | 2/2013 | Aizman | G06F 16/182 707/690 |
| 2013/0042060 | A1* | 2/2013 | Marukame | G06F 12/0246 711/108 |
| 2013/0054928 | A1* | 2/2013 | Im | G06F 12/0246 711/170 |
| 2013/0124466 | A1* | 5/2013 | Naidu | G06F 16/235 707/610 |
| 2013/0124467 | A1 | 5/2013 | Naidu et al. | |
| 2013/0151884 | A1* | 6/2013 | Hsu | G06F 11/2035 714/4.11 |
| 2013/0246315 | A1* | 9/2013 | Joshi | G06N 5/04 706/10 |
| 2013/0297624 | A1* | 11/2013 | Raghunathan | G06F 16/334 707/752 |
| 2013/0326189 | A1* | 12/2013 | Cilibrasi | G06F 3/0644 711/208 |
| 2014/0032595 | A1* | 1/2014 | Makkar | G06F 16/25 707/770 |
| 2014/0040286 | A1* | 2/2014 | Bane | G06F 16/164 707/754 |
| 2014/0052711 | A1* | 2/2014 | Bamba | G06F 16/29 707/718 |
| 2014/0081978 | A1* | 3/2014 | Fuchs | G06F 16/285 707/740 |
| 2014/0122491 | A1* | 5/2014 | Pennefather | G06F 19/321 707/737 |
| 2014/0156642 | A1* | 6/2014 | Johnson | G06F 16/13 707/722 |
| 2014/0201244 | A1* | 7/2014 | Zhou | G06F 16/00 707/803 |
| 2014/0215574 | A1* | 7/2014 | Erb | H04L 63/10 726/4 |
| 2014/0229479 | A1* | 8/2014 | Sharafi | G06Q 50/01 707/736 |
| 2014/0229628 | A1* | 8/2014 | Mandal | G06F 16/24568 709/231 |
| 2014/0280032 | A1* | 9/2014 | Kornacker | G06F 16/2471 707/718 |
| 2014/0282615 | A1* | 9/2014 | Gavage | G06F 9/4493 719/316 |
| 2014/0330802 | A1* | 11/2014 | Preslan | H04L 67/1097 707/704 |
| 2014/0372384 | A1* | 12/2014 | Long | G06F 16/21 707/679 |
| 2015/0067004 | A1* | 3/2015 | Shvachko | G06F 16/166 707/827 |
| 2015/0095308 | A1* | 4/2015 | Kornacker | G06F 16/24534 707/718 |
| 2015/0095379 | A1* | 4/2015 | Dickie | G06F 16/22 707/803 |
| 2015/0113010 | A1* | 4/2015 | Muthyala | G06F 16/182 707/756 |
| 2015/0169602 | A1* | 6/2015 | Shankar | G06F 16/907 707/825 |
| 2015/0278244 | A1* | 10/2015 | Shvachko | G06F 16/182 707/634 |
| 2015/0286665 | A1* | 10/2015 | Nyman | G06F 16/24573 707/737 |
| 2015/0293984 | A1* | 10/2015 | Zolotusky, Jr. | G06F 16/27 707/634 |
| 2015/0312356 | A1* | 10/2015 | Roth | G06F 11/25 709/226 |
| 2016/0098662 | A1* | 4/2016 | Voss | G06Q 10/06316 705/7.26 |
| 2016/0140176 | A1* | 5/2016 | Chamberlin | G06F 16/217 707/718 |

OTHER PUBLICATIONS

U.S. Office Action dated Nov. 30, 2016 corresponding to U.S. Appl. No. 14/501,904; 15 Pages.
U.S. Notice of Allowance dated May 24, 2017 corresponding to U.S. Appl. No. 14/501,891; 7 Pages.
Response to U.S. Non-Final Office Action dated Nov. 30, 2016 for U.S. Appl. No. 14/501,904; Response filed on Feb. 28, 2017; 8 Pages.
Response to U.S. Non-Final Office Action dated Nov. 30, 2016 for U.S. Appl. No. 14/501,891; Response filed on Feb. 28, 2017; 8 Pages.
Hadoop Wiki, "Overview of Sequence File;" Downloaded on Feb. 16, 2015; 3 Pages; https://wiki.apache.org/hadoop/SequenceFile.
Hadoop Wiki, "HDFS Architecture Guide;" Downloaded on Jan. 26, 2015; 8 Pages; http://hadoop.apache.org/docs/r1.0.4/hdfs_design.html.
EMC Corporation, "What is ViPR HDFS?;" Downloaded Jan. 26, 2015; 6 Pages; http://www.emc.com/techpubs/vipr/HDFS_overview-1.htm.
EMC Corporation; "ViPR 2.1—Use the ViPR Object Services;" Downloaded Oct. 1, 2014; 10 Pages; http://www.emc.com/techpubs/vipr/ds_use_object_services-2.htm.
EMC Corporation; "ViPR 2.1—ViPR S3 Object Service API Support;" Downloaded Oct. 1, 2014; 8 Pages; http://www.emc.com/techpubs/vipr/ds_s3_supported_features-t.htm.
EMC Corporation; "ViPR EMC Atmos Object Service API Support;" Downloaded Oct. 1, 2014; 7 Pages; http://www.emc.com/techpubs/vipr/ds_atmos_supported_features-1.htm.
EMC Corporation; "ViPR 2.1—ViPR OpenStack Swift Object Service API Support;" Downloaded Oct. 1, 2014; 5 Pages; http://www.emc.com/techpubs/vipr/ds_swift_supported_features-2.htm.
EMC Corporation; "ViPR 2.1—Use S3 Applications with ViPR Object Storage;" Downloaded Oct. 1, 2014; 7 Pages; http://www.emc.com/techpubs/vipr/ds_use_s3_apps_with_vipr-2.htm.

(56) References Cited

OTHER PUBLICATIONS

EMC Corporation; "ViPR 2.1—Create Buckets to Support ViPR Data Services;" Downloaded Oct. 1, 2014; 11 Pages; http://www.emc.com/techpubs/vipr/ds_create_bucket-2.htm.
EMC Corporation; "Unleash the Value of Data with EMC ViPR Services;" Apr. 2014; 11 Pages.
Graham et al.; "Object Metadata Query with Secondary Indexes;" U.S. Appl. No. 14/501,891, filed Sep. 30, 2014; 37 Pages.
Graham et al.; "Object Metadata Query;" U.S. Appl. No. 14/501,904, filed Sep. 30, 2014; 33 Pages.
Graham et al., "Object Metadata Query With Distributed Processing Systems;" U.S. Appl. No. 14/674,324, filed Mar. 31, 2015; 44 Pages.
Notice of Allowance dated Jun. 26, 2017 for U.S. Appl. No. 14/501,904; 7 Pages.
U.S. Non-Final Office Action dated Jul. 27, 2017 for U.S. Appl. No. 14/674,324; 34 Pages.
Response to Office Action filed Oct. 26, 2017 for U.S. Appl. No. 14/674,324; 12 pages.
Response to U.S. Final Office Action dated May 31, 2017 for U.S. Appl. No. 14/501,904; Response filed on Jun. 13, 2017; 7 Pages.
U.S. Final Office Action dated May 31, 2017 for U.S. Appl. No. 14/501,904; 7 Pages.
RCE and Response to Final Office Action dated Feb. 9, 2018 for U.S. Appl. No. 14/674,324, filed Aug. 7, 2018; 20 Pages.
Notice of Allowance dated Feb. 28, 2019 for U.S. Appl. No. 14/674,324; 21 pages.
U.S. Final Office Action dated Feb. 9, 2018 corresponding to U.S. Appl. No. 14/674,324; 15 Pages.

\* cited by examiner

Metadata Collection 300

Object A Metadata 302a

| Key 1 | Value 1 |
|---|---|
| Key 2 | Value 2 |
| Key 3 | Value 3 |

Object B Metadata 302b

| Key 1 | Value 1 |
|---|---|
| Key 3 | Value 3 |

Object C Metadata 302c

| Key 2 | Value 2 |
|---|---|
| Key 4 | Value 4 |
| Key 5 | Value 5 |
| Key 6 | Value 6 |

*FIG. 3*

METHOD AND APPARATUS FOR PROCESSING OBJECT METADATA

BACKGROUND

Currently available object stores include Amazon S3, Red Hat Ceph, Open Stack Swift, EMC's Atmos, and EMC's ViPR Object Data Service. Such systems may provide scale-out mechanisms for users to store and retrieve object data and metadata. These systems typically provide REST-based application programming interfaces (APIs) to insert, update, delete, and retrieve objects. For example, in the field of medical science, an object store may be used to store Digital Imaging and Communications in Medicine (DICOM) information, which contains metadata as well as the actual image data. Such metadata may include a patient's id, gender, age, etc.

Distributed processing systems allow for large-scale distributed processing. For example, Hadoop and Apache Spark are open-source distributed computing frameworks that enable distributed processing using commodity computing device. It is known to expose object data to distributed processing systems.

SUMMARY

Described herein are systems and techniques for exposing not only object data, but also object metadata, to distributed processing systems such as Hadoop. A distributed object store may acts as a Hadoop Compatible File System (HCFS), exposing object metadata as a collection of records that can be efficiently processed by MapReduce (MR) and other distributed processing frameworks. Various metadata records formats are supported.

According to one aspect of the disclosure, a method comprises: receiving a data request for object metadata from a distributed processing system, the data request identifying one or more objects stored within a distributed object store; for each identified object, determining a location of corresponding object metadata stored within the distributed object store; for each identified object, retrieving the corresponding object metadata using the determined location; for each identified object, generating a metadata record from the corresponding object metadata; combining the metadata records from the identified objects into a metadata collection having a format compatible with the distributed processing system; and returning the metadata collection to the distributed processing system.

In some embodiments, receiving the data request for object metadata comprises receiving a data request for object metadata in a bucket, the method further comprising identifying the one or more objects as objects associated with the bucket. The data request may further identifies a partition, wherein identifying one or more objects as objects associated with the bucket comprises identifying one or more objects as objects associated with the bucket and the partition. The data request further may identify a path, wherein identifying one or more objects as objects associated with the bucket comprises identifying one or more objects as objects associated with the bucket and matching the path.

In certain embodiments, receiving the data request for object metadata from a distributed processing system comprises receiving a data request from a Hadoop cluster. Receiving the data request for object metadata may comprise receiving an Hadoop Distributed File System (HDFS) DataNode request. The method may further comprise receiving a Hadoop Distributed File System (HDFS) NameNode request from the distributed processing system, the HDFS NameNode request identifying a bucket within the distributed object store. Generating the metadata record from the corresponding object metadata may include generating a record in Apache Avro format, Apache Thrift format, Apache Parquet format, Simple Key/Value format, JSON format, Hadoop SequenceFile format, or Google Protocol Buffer format.

In some embodiments, receiving the data request for object metadata from a distributed processing system comprises receiving a data request from an Apache Spark cluster. Combining the metadata records into the metadata collection may comprise forming a Resilient Distributed Dataset (RDD).

In various embodiments, determining the location of corresponding object metadata stored within the distributed object store comprises using a distributed key/value store. Identifying the one or more objects as objects associated with the bucket may comprise issuing a PREFIX-GET command to a distributed key/value store, the PREFIX-GET command identifying a tenant and the bucket.

According to another aspect of the disclosure, a system comprises: a distributed key/value store; a plurality of storage devices to store object data and object metadata; and a plurality of data service nodes, each of the data service nodes coupled to the distributed key/value store and corresponding ones of the storage devices. A first one of the plurality of data service nodes may comprise: an object storage engine to determine the location of object metadata stored within the plurality of storage devices using the distributed key/value store; a storage controller to retrieve the object metadata from the plurality of storage devices; a metadata formatting module to generate metadata records from object metadata and to combine metadata records into a metadata collection having a format compatible with a distributed processing system; and an interface to receive a data request for object metadata from the distributed processing system, the data request identifying one or more objects stored within a distributed object store, and to return a metadata collection to the distributed processing system. In certain embodiments, the data request is a request for object metadata, wherein the data request identifies the one or more objects as objects in a bucket.

In some embodiments, the distributed processing system comprises a Hadoop cluster The data request may be Hadoop Distributed File System (HDFS) DataNode request. The interface can be further configured to receive a Hadoop Distributed File System (HDFS) NameNode request from the distributed processing system, the HDFS NameNode request identifying a bucket within the distributed object store. The metadata formatting module may generate metadata records in Apache Avro format, Apache Thrift format, Apache Parquet format, Simple Key/Value format, JSON format, Hadoop SequenceFile format, or Google Protocol Buffer format. In other embodiments, the distributed processing system comprises an Apache Spark cluster.

BRIEF DESCRIPTION OF THE DRAWINGS

The concepts, structures, and techniques sought to be protected herein may be more fully understood from the following detailed description of the drawings, in which:

FIG. 3 is a block diagram of an illustrative metadata collection;

The drawings are not necessarily to scale, or inclusive of all elements of a system, emphasis instead generally being placed upon illustrating the concepts, structures, and techniques sought to be protected herein.

DETAILED DESCRIPTION

The phrases "computer," "computing system," "computing environment," "processing platform," "data memory and storage system," and "data memory and storage system environment" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" can also refer to a storage array comprising one or more storage devices.

The term "memory" herein refers to any type of computer memory accessed by an application using memory access programming semantics, including, by way of example, dynamic random access memory (DRAM) and memory-mapped files. Typically, reads or writes to underlying devices is done by an operating system (OS), not the application. As used herein, the term "storage" refers to any resource that is accessed by the application via input/output (I/O) device semantics such as read and write systems calls. In certain instances, the same physical hardware device could be accessed by the application as either memory or as storage.

Figure 1:
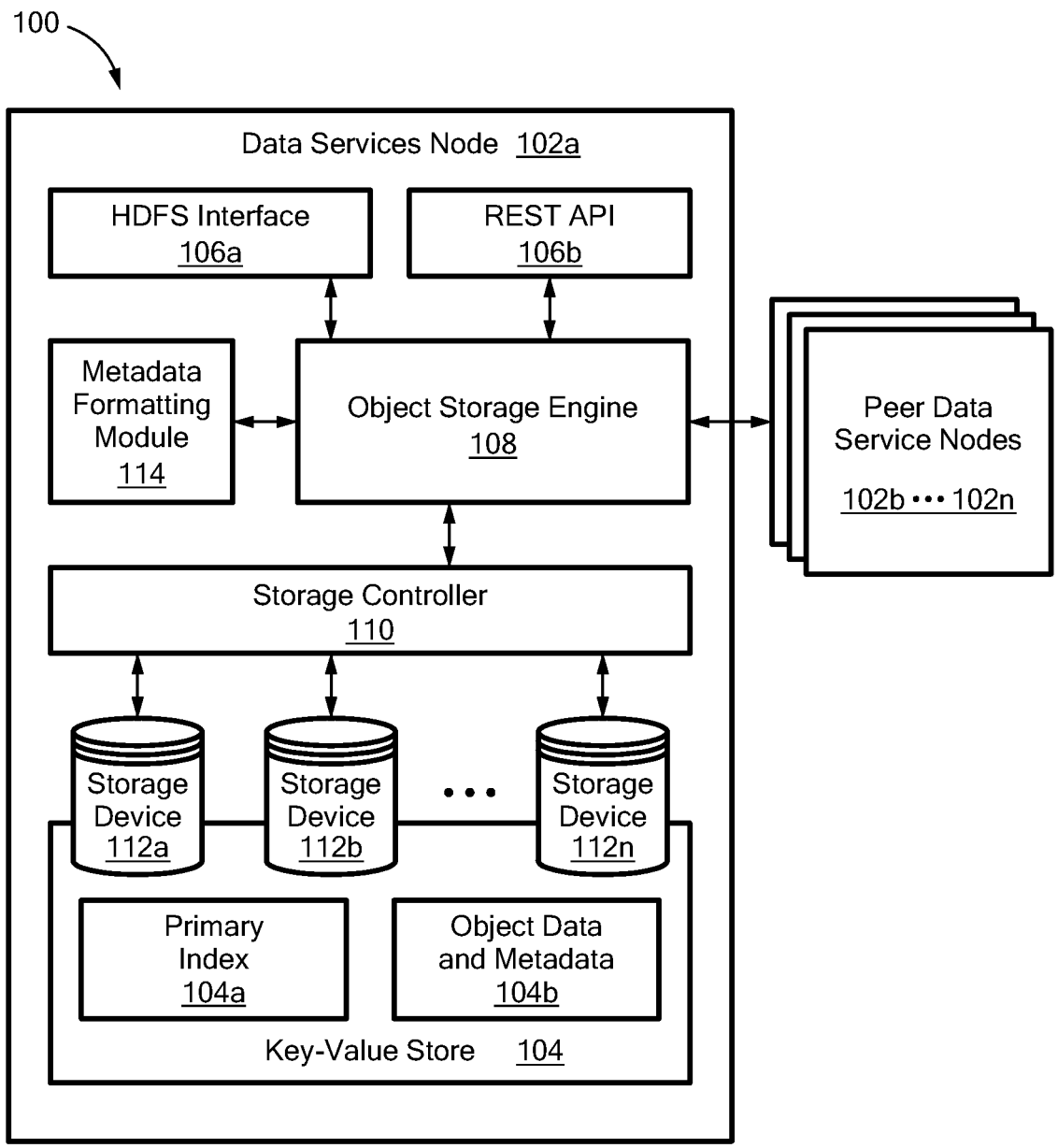
FIG. 1 is a diagram of an illustrative distributed object store.

Referring to FIG. 1, an illustrative distributed object store 100 comprises a plurality of data service nodes 102a-102n operatively coupled to each other via a high-speed data channel or network, such as a local-area network (LAN) or a wide-area network (WAN). In certain embodiments, data service nodes 102 communicate peer-peer over IPC using Google Protocol Buffers.

The distributed object store 100 is capable of storing and retrieving object data and associated metadata. Objects may be uniquely identified within the system using an object key comprising one or more namespace identifiers and a unique object id within the identified namespace. In some embodiments, the namespace identifiers include a tenant id and a bucket id, where the tenant id uniquely identifies a tenant (i.e., a customer, a user, or any other top-level entity) within the distributed object store and the bucket id uniquely identifies a collection of objects (or "bucket") defined by and belonging to the tenant. The tenant, bucket, and object ids can be any suitable values, such as strings, numbers, or a combination thereof.

Various types of clients (not shown) can use the distributed object store 100 to store and retrieve object data and metadata via a network (e.g., the Internet). The clients may include command-line applications, web applications, mobile applications, MapReduce (MR) jobs, or any other type of application concerned with object storage and retrieval.

Any one of the data nodes 102 may be capable of receiving and processing client requests. In some embodiments, a client can direct requests to a specific one of the data service nodes 102a-102n. In various embodiments, a load balancer (not shown) is provided between the clients and the data service nodes 102. Thus, a client may direct requests to the load balancer, which in turn selects one of the data nodes 102 to service the request and forwards the request thereto. Any suitable load balancing techniques can be used.

In addition to processing client requests, a given data service node 102 can manage one or more storage devices 112 in which object data and metadata is stored. To facilitate scaling up storage capacity, the entire set of data stored within the system 100 may be partitioned across the plurality of nodes 102 such that no single node stores or otherwise manages the entire dataset. Objects belonging to a common tenant or bucket may be split across storage devices 112 and/or nodes 102. In some embodiments, a data or metadata for a single object may be split into "shards" and stored across multiple storage devices 112 and/or nodes 102. To improve fault tolerance and data availability, object data and/or shards may be replicated across multiple storage devices 112 and/or nodes 102 according to a configurable replication policy. It will be appreciated that the aforementioned storage architecture allows object data and metadata to be written/read in parallel to/from multiple storage devices 112 and data nodes 102, improving I/O performance.

In this example, the system 100 includes a first data service node 102a, which is shown in detail, and one or more peer data nodes 102b-102n. The term "peer" is used herein to describe nodes that are generally identical in functionality and/or structure. Accordingly, the peer data nodes 102b-102n may similar (or even identical) to the first node 102a. In some embodiments, each node 102 corresponds to a separate physical and/or virtual computing platform. In certain embodiments, a data service node 102 comprises off-the shelf server hardware and/or software, e.g., a Windows server, a Sun Solaris server, an HP server, a Linux server, etc. Processing and storage capabilities of the system 100 can readily be scaled up by adding data service nodes 102.

The illustrative data service node 102a includes one or more interfaces 106, an object storage engine 108, a storage controller 110, one or more storage devices 112, and a metadata formatting module 114. The various components 106-114 may be coupled as shown, or in any other suitable arrangement.

A data service node 102 can be associated with an arbitrary number of storage devices 112a-112, as shown. A storage device 112 may be local to the data node 102a, or may be part of a network-attached storage (NAS) system.

For example, two or more data service nodes 102 may be coupled to a common storage array, whereby storage devices 112 correspond to logical unit numbers (LUN) therein. In certain embodiments, storage devices 112 are managed by a local storage controller 110. In other embodiments, the storage controller 110 may be provided by a storage array.

To support a diverse set of client applications, the distributed object store 100 includes one or more interfaces (sometimes referred to as "adapters") 106. A given interface 106 may implement application-programming interfaces (APIs) built on top of conventional network communication protocols such as TPC/IP and HTTP, data-interchange formats such as Extensible Markup Language (XML) and JavaScript Object Notation (JSON), and/or remote procedure call (RPC) frameworks such as Apache Thrift. In this example, the illustrative data services node 102a includes an HDFS interface 106a and one or more REST APIs 106b.

The HDFS interface 106a enables Hadoop applications, Apache Spark applications, and other HDFS-compatible clients to access data from the distributed object store 100. Specifically, the HDFS interface 106a implements various NameNode and DataNode operations necessary to provide a Hadoop Compatible File System (HCFS). The HDFS interface 106a provides an HDFS "head" that allows buckets to appear as directories, and objects to appear as files in the Hadoop File System format.

The HDFS interface 106a can also expose object metadata to HDFS, making object metadata available for distributed processing and analysis. In various embodiments, all metadata for a given bucket (i.e., all metadata for all objects in a given bucket) is exposed as a collection of metadata records. The collection and/or records may be formatted so as to be compatible with the distributed processing system using the metadata formatting module 114, as discussed further below. For example, in the case of Hadoop, all metadata for a given bucket may be exposed as a single HDFS "file." Advantageously, the distributed processing system 100 can support many different metadata formats.

The REST APIs 106b may include an API compatible with the Amazon's S3 API and/or an API compatible with OpenStack's Swift API. It will be understood that these REST APIs generally provide a set of bucket-based operations and a set of object-based operations. Non-limiting examples of bucket-based operations exposed via a REST API include: creating a bucket, updating bucket information, deleting a bucket, and retrieving a list of objects within a bucket (sometimes referred to as a "list bucket operation"). Non-limiting examples of object-based operations include: add an object with data and optionally metadata, retrieve an object's data and metadata, retrieve only metadata for an object, update an object's data and metadata, and delete an object. In some embodiments, the HTTP request method is used to determine the type of operation being requested (e.g., "POST" may be used to add an object, "GET" to read the object, and "PUT" to update the object).

It should be understood that additional interfaces 106 can be readily provided. For example, a data services node 102 could include a Graphical User Interface (GUI), command-line interfaces, or other types of application or user interfaces.

As mentioned above, the distributed object store 100 can shard object data and metadata across multiple storage devices 112 and nodes 102 and, further, may store multiple replicas of object data/metadata to improve fault tolerance and data availability. To track the location of object data across the plurality of storage devices 112 and nodes 102, the system 100 may include mapping between object keys and storage locations, referred to herein as the "primary index." In various embodiments, a primary index 104a is implemented using a key-value store 104 stored within the storage devices 112.

Those skilled in the art will understand that distributed key-value stores provide high performance, massive scalability, and fault-tolerance and typically do not impose a schema on the stored data. In various embodiments, the key-value store 104 is a commercial off-the-shelf (COTS) key-value store such as Riak, MemcacheDB, or Voldemort. It will also be understood that some key-value stores provide not only the ability to retrieve a value for a single key (referred to herein as a "GET" operation), but also the ability to retrieve key-value pairs for a range of a keys that match a given prefix (referred to herein as a "PREFIX-GET" operation). In some embodiments, the key-value store includes a B+Tree implementation, a journal, and an in-memory cache.

Using these and other features of the key-value store 104, a primary index 104a can be implemented to provide an efficient mapping between object keys and storage locations. As mentioned above, objects can be uniquely identified within the distributed object store 100 from the combination of tenant id, bucket id, and object id. The primary index 104a may use the key format "<tenant id>.<bucket id>.<object id>." Thus, information about all objects within a bucket can be retrieved by issuing a PREFIX-GET operation on the primary index 104a using the prefix "<tenant id>.<bucket id>." This technique can be used to efficiently implement a "bucket scan" operation, as discussed below. It will be appreciated that other key formats can be used.

In some embodiments, the object data and/or object metadata is also stored within a key-value store 104. Thus, as shown in FIG. 1, a single key-value store 104 can be used to store both the primary index 104a and the object data/metadata 104b upon a common set of storage devices 112.

The object storage engine (or "storage engine") 108 processes requests to read and write object data and metadata. In some embodiments, the storage engine 108 includes an internal API used by the interfaces 106. Thus, for example, a given interface 106a, 106b can receive a client request using an external API, translate the request into one or more internal API operations, execute those internal API operations against the storage engine 108, and return an appropriate response to the client according to the external API.

As discussed above in conjunction with the REST-based API 106b, the system 100 may support operations to store and retrieve data/metadata for a given object, and a "list bucket" operation to retrieve all object data/metadata for a given bucket. To implement such operations, the storage engine 108 first determines the corresponding object storage location(s) using the primary index 104a. For example, to retrieve data for a single object, the storage engine 108 determines the object's storage location (or possibly multiple storage locations if sharding or replication are used) by issuing a GET operation to the key-value store 104 using a specified tenant id, bucket id, and object id. As another example, to retrieve all object data in a bucket, the storage engine 108 determines a storage location (or multiple storage locations) for each object in the bucket by issuing a PREFIX-GET operation to the key-value store 104. Once the storage locations are known, the storage engine 108 can proceed with the read/write operation. For storage locations that are local to its node (node 102a in this example), the storage engine 108 can issue read/write commands to a local storage controller 110, which in turn reads/writes data from an appropriate storage device 112. In some embodiments, local object data and/or metadata is read from (and written to) the key-value store 104*b*. For remote storage locations, the storage engine 108 may issue remote commands to the appropriate peer nodes 102*b*-102*n*, which read/write data from their locally managed storage devices and return data (or a write acknowledgement) to the original node 102*a*.

In various embodiments, the distributed object store 100 is based on ViPR Object Data Services by EMC Corporation, a massively scale-out, geo-replicated object store. ViPR Object is compatible with various commercially available file-based storage solutions, such as EMC Isilon® and VNX®, and NetApp® storage systems. Thus, for example, the storage controllers 110 and/or storage devices 112 may be provided by (or form a part of) a commercial available file-based storage solution.

Figure 2:
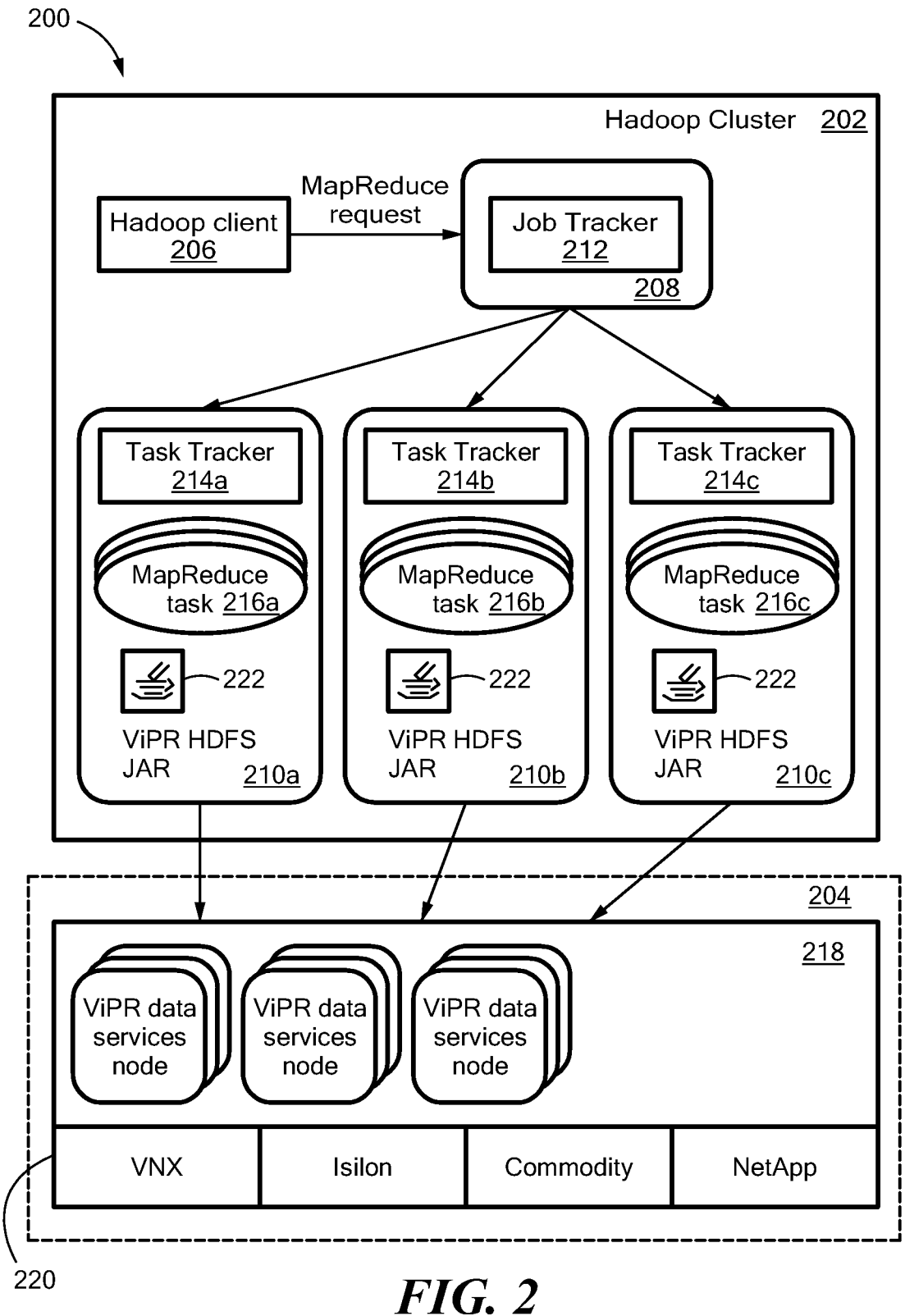
FIG. 2 is a diagram of an illustrative processing environment having a distributed processing system and a distributed object store.

Referring to FIG. 2, an illustrative processing environment 200 includes a distributed processing system 202 and a distributed object store 204, which may be the same as or similar to distributed object store 100 of FIG. 1. In this example, the distributed processing system 202 is shown to be a Hadoop cluster, although it will be appreciated that the concepts, structures, and techniques sought to be protected herein can be used with other distributed processing systems, including but not limited to Apache Spark clusters. For succinctness, distributed processing system 202 may be referred to herein as "cluster" 202.

A Hadoop cluster may provide both distributed processing capabilities and distributed data storage functionality. Distributed processing is typically provided by a MapReduce (MR) engine, which manages execution of MR jobs submitted by a job client (e.g., a user application). Hadoop MR is a software framework to facilitate developing applications that process vast amounts of data (e.g., multi-terabyte datasets) in parallel on large clusters (e.g., thousands of nodes) of commodity hardware in a reliable, fault-tolerant manner. An MR job determines how an input dataset should be split independent partitions (sometimes referred to as "splits") which can be processed by so-called "map tasks" in a parallel manner. The MR framework sorts the outputs of the map tasks, which are then input to so-called "reduce tasks." The final output of the job is based on the output of the reduce tasks. The MR engine uses a JobTracker to manage execution of a job, and one or more TaskTrackers to manage execution of tasks. The MR framework handles scheduling tasks, monitoring tasks, and re-executing failed tasks.

A Hadoop cluster may utilize a distributed file system conforming to the Hadoop Compatible File System (HCFS) specification. The HCFS may be implemented within the cluster 202, or may external to the cluster. For example, a Hadoop cluster may include an HDFS NameNode to provide metadata functions, and one or more HDFS DataNodes to provide data I/O functionality. Typically, both a job's input and output are stored within a distributed file system. Intermediate results data (i.e., the output of individual map-reduce tasks) may be also be stored in a distributed file system. A single MR job can use multiple different file systems. For example, a job's input dataset could be read from an external HCFS, whereas the job's output data could be written to an HDFS instance local to the cluster 202.

A typical Hadoop cluster architecture includes a single master node and multiple worker nodes. The master node may act as a JobTracker, a TaskTracker, a NameNode, and a DataNode. The master node is responsible for scheduling a job's component tasks on the slaves, monitoring the tasks, and re-executing the failed tasks. The slaves execute the tasks as directed by the master. A slave or "worker node" may act as both a DataNode and TaskTracker, though it is possible to have data-only worker nodes and compute-only worker nodes.

A job client can submit new jobs to the JobTracker, specifying the location of the job's input dataset, the location where the job's output should be written, along with implementations of "map," "combine," and "reduce" functions. Such implementations may be provided as an executable, a Java Archive (JAR), or in any other suitable format.

The illustrative cluster 202 includes a job client 206, a master node 208, and one or more slave nodes 210, with three slave nodes 210*a*-210*c* shown in this example. The master node 208 may include a JobTracker 212 and a TaskTracker (not shown). A given one of the slave nodes 210*a*-210*c* may include a respective TaskTracker 214*a*-214*c* to execute respective MapReduce tasks 216*a*-216*c*. In some embodiments, each node 208, 210 may correspond to a separate physical and/or logical processing device.

The illustrative distributed object store 204 includes a plurality of data services nodes 218 and object storage 220, which may correspond to a storage array. The distributed object store 204 exposes object data and object metadata to the cluster 202 for distributed processing via an interface (e.g., HDFS interface 106*a* in FIG. 1). In the case of a Hadoop cluster 202, the distributed object store 204 appears as an HDFS "head" that allows buckets to appear as directories and object data and metadata to appear as files in the Hadoop File System format. In some embodiments, each data services node 218 acts as Hadoop Compatible File System (HCFS), implementing requisite NameNode and DataNode functionality. Thus, whereas a typical HDFS architecture includes one NameNode and multiple DataNodes, each node of the distributed object store 204 may act as both a NameNode and a DataNode such that all nodes are peers. Because any of the data nodes 218 data nodes are capable of accepting HDFS requests and servicing them, there is no single point of failure.

The cluster 202 may use the distributed object store 204 in various capacities. In some embodiments, the distributed object store 204 is an input data source for MR jobs and tasks. Here, the distributed object store 204 exposes object data or object metadata to the cluster 202 in a suitable format. For example, the distributed object store 204 may expose all object data in a given bucket as an HDFS directory having one file per object in the bucket. As another example, the distributed object store may expose all object metadata in a bucket as a single HDFS file containing multiple records.

In some embodiments, the cluster 202 also uses the distributed object store 204 to store intermediate task output and/or final job output. Alternatively, the cluster 202 may include a local HDFS cluster (i.e., a NameNode and one or more DataNodes) to store intermediate and/or final MR output.

It should be appreciated that the distributed object store 204 enable users to run Hadoop applications on top of various storage infrastructures 220, including EMC Isilon® and VNX®, and NetApp®, and commodity storage.

In certain embodiments, the cluster 202 uses a remote storage client 222 configurable to perform HDFS activity against a remote system, such as distributed object store 204. The remote storage client 222 may be provided as a set of Java classes (e.g., a JAR file) accessible by MR tasks 216. In some embodiments, the remote storage client 222 provides an implementation of a Hadoop FileSystem interface (i.e., org.apache.hadoop.fs.FileSystem for Hadoop 1 and/or org.apache.hadoop.fs.AbstractFileSystem for Hadoop 2), and thus may provide file and directory management (create, list, delete, set permissions, etc.), file read and write, and block location information.

Prior to running an MR job, the cluster 202 may be configured for operation with the distributed object store 204. For example, Hadoop stores system configuration information in a file named "core-site.xml," which resides on each node of a Hadoop cluster. Non-limiting examples of properties that may be added or modified in core-site.xml include: (1) remote storage client properties, such as properties to specify the location of the remote storage client 222 and/or configure the remote storage client 222; (2) file system location properties, such as properties define the file system URI (scheme and authority) to use when running Hadoop jobs, and IP addresses of the distributed object store data nodes 218 (or a load balancer in front of nodes 218); and (3) authentication and identification properties, such as properties to map user identities within the distributed object store 204 to user identities within the cluster 202.

Once the cluster 202 is configured to use the distributed object store 204 as a Hadoop file system, a user can define and execute Hadoop jobs (via the job client 206) that operate on object data and/or metadata within the distributed object store 204. Using Hadoop convention, the location of the job input dataset can be specified using a Uniform Resource Identifier (URI). In some embodiments, URI has the following format:

objectfs://bucket.tenant.installation/path.

In this illustrative format, "objectfs" is a fixed URI scheme value associated with the distributed object store 204. When the cluster 202 sees this particular scheme value, it activates the remote storage client 222 which, in turn, selects appropriate properties from the cluster configuration file (e.g., core-site.xml), connects to the distributed object store 204, and performs any other processing necessary to operate with the distributed object store 202. The "tenant" identifies a tenant (i.e., a namespace) within the distributed object store 204 and "bucket" identifies a bucket associated with the tenant. The identified bucket may contain object data and/or metadata to be analyzed by the cluster 202. The "installation_name" is a user-assigned name to specify a set of hosts (i.e., data service nodes 220 or a load balancer) to use for HDFS operations. For example, a user may define multiple different host lists within core-site.xml and select the desired host list on a per-job basis by changing the "installation_name" value.

The "/path" portion of the URI is optional. If the path is provided, it specifies the id of a single object within the bucket for which data or metadata should be retrieved. Alternatively, if no path is specified, all objects in the specified bucket will be retrieved.

In some embodiments, a job specifies whether to operate on object data or whether to operate on object metadata based on the URI, as shown in the following example:

objectfs://bucket.tenant.installation/
path?objectMetadata=true.

In this example, if the query parameter "objectMetadata" is set to "true," the distributed object store will respond with object metadata; otherwise it will respond with object data. As with the example above, the "path" is optional.

For object data, the distributed object store 204 may expose a separate HDFS file for each object in a specified bucket (or the single object specified by "path"). A conventional InputFormat (e.g., an InputFormat provided by the Hadoop framework) may be selected based on the type of object data being processed. For example, for text-based object data, a suitable text-based InputFormat can be selected. As another example, a binary InputFormat could be selected for processing image data. The InputFormat determines how data can be partitioned (or "split") for distributed processing by multiple MR tasks 216. For example, when the input is a file, the input format may produce a partition for each file block, which are typically between 128 MB to 1 GB in size.

For object metadata, the distributed object store 204 may provide all metadata for a specified bucket/path as a concatenated list of metadata for all objects in the specified bucket/path, referred to herein as a "metadata collection." In some embodiments, a metadata collection may correspond to a single HDFS file. It is appreciated herein that the MR programming model, which is used by Hadoop and other distributed processing frameworks, is designed to operate efficiently on very large files.

Referring to FIG. 3, a metadata collection 300 illustrates a format that may be used by a distributed object store 202 to expose object metadata to a distributed processing system (or "cluster") 204. The distributed object store 204 exposes metadata by treating metadata for a particular object as a single entity, referred to herein as a "metadata record," wherein each metadata record includes the object's metadata as key/value pairs, columnar data, or in any other suitable form. The illustrative metadata collection 300 includes three metadata records 302a-302c, which may correspond to metadata for objects in a bucket.

The general data format shown in FIG. 3 may be implemented using any suitable data formatting/serialization technique. A metadata record 300 may be formatted to be compatible with a particular type of cluster 202, and a single distributed object store 204 may be compatible with multiple different types of cluster 202. For example, if the cluster 202 is a Hadoop cluster, the distributed object store 204 may return metadata collection formatted using Apache Avro, Apache Thrift, Apache Parquet, Simple Key/Value, JSON, Hadoop SequenceFile, or Google Protocol Buffer. If the cluster 202 is based upon the Spark framework, the distributed object store 300 may return a metadata collection 300 formatted as a Resilient Distributed Dataset (RDD). In certain embodiments, a metadata formatting module 114 (FIG. 1) may include libraries or other processing to convert object metadata from an internal representation used within the distributed object store 100 to one any of the aforementioned data formats. In some embodiments, the metadata collection format returned by the distributed object store 204 is configurable (e.g., on a per-request or a per-installation basis), and an appropriate default format can be defined (e.g., Google Protocol Buffer or SequenceFile).

The cluster 202 may be configured to parse a metadata collection 300. In the case of a Hadoop cluster, a MR job may use an InputFormat implementation retrieve information about an overall metadata collection for a bucket and split the metadata collection into partitions for MR tasks to process. The MR job can determine how many tasks to execute across the cluster, and onto which nodes the tasks should be assigned. Each MR task may use an InputFormat implementation to retrieve and parse its corresponding partition of metadata records. As used in this context, a "partition" refers to a unit of data that can be processed within the distributed processing system. In the case of Hadoop, each partition may be processed by a separate MR task. Because it is relatively expensive (in terms of time and/or processing resources) to initiate a MR task, preferably a single task should process many objects worth of metadata (i.e., performance may be improved by increasing partition size).

Figure 4:
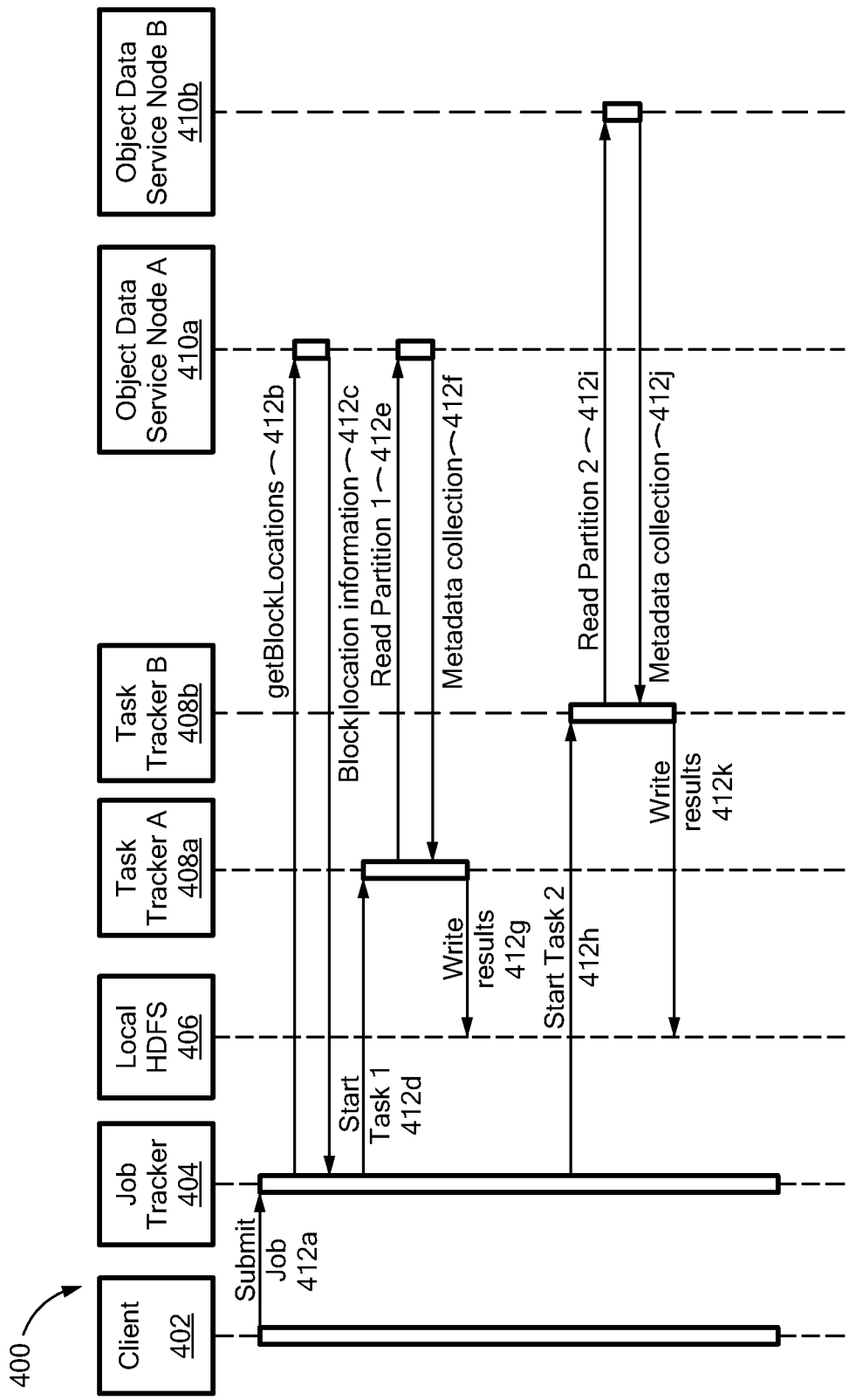
FIG. 4 is an interaction diagram showing interaction between a distributed processing system and a distributed object store.

FIG. 4 is an interaction diagram 400 showing interaction between a cluster 202 and a distributed object store 204. The diagram shows interaction between various processing units 402-410 over time, wherein interactions between processing units are shown by horizontal lines 412a-412k. The interactions may correspond to remote procedure calls, API operations, etc. In FIG. 4, the interactions between processing units is shown in an orderly, synchronous fashion. It should be understood that this is merely to promote clarity of understanding and that interactions can occur in parallel and/or in an asynchronous manner.

A given processing unit 402-410 may correspond to any physical and/or logical processing device. In some embodiments, one or more of the process units 402-410 correspond to nodes within the cluster 202 or distributed object store 204. In this example, the processing units include a job client 402, a JobTracker 404, local HDFS 406, Job Trackers 408a and 408b, and data service nodes 410a and 410b. The processing units 402-408 may correspond to portions of the cluster 202 and data service nodes 410a and 410b may correspond to nodes within the distributed object store 204.

At line 412a, the job client 402 submits a new job to the JobTracker 404. The job may be configured to analyze object metadata within a specified object store bucket. At line 412b, the JobTracker 404 requests information about the overall metadata "file" for bucket. Here, "file" corresponds to a metadata collection for a bucket (i.e., a concatenated list of metadata for all objects in the bucket) and may be specified using a URI as described above. The request 412b can be made to an arbitrary a data service node 410 (410a in this example). At line 412c, data service node 410a responds with information about the bucket metadata file that the JobTracker 404 can use for planning purposes. In the case of Hadoop, request 412b may correspond to a getBlockLocations( ) call, and the response 412c may include block location information, including the number of blocks in the file, and which data service nodes 410 host which blocks. Using this information, the JobTracker 404 can produce partitions (or "splits") and assign the partitions to TaskTrackers 408 for distributed processing.

In this example, the JobTracker 404 determines that the bucket metadata file should be split into a first partition ("Partition 1") and a second partition ("Partition 2") to be processed by TaskTrackers 408a and 408b, respectively. Also in this example, the first and second partitions are assumed to be hosted by data service nodes 410a and 410b, respectively. In some embodiments, the JobTracker 404 attempts to collocate each task trackers 408a with its assigned partition data. Thus, TaskTracker 408a and data service node 410a may be collocated, and TaskTracker 408b and data service node 410b may be collocated.

At line 412d, the JobTracker 404 instructs TaskTracker 408a to commence processing the first partition. At line 412e, the TaskTracker 408a may proceed to read the first partition of metadata from data service node 410a. At line 412f, the data node 410a responds with a collection of metadata records corresponding to the first partition. The metadata is provided in a suitable format. It should be appreciated that data service node receiving the data request could, if necessary, retrieve data from a peer node (e.g., node 410a could retrieve data from node 410b). In some embodiments, the receiving data service node 410a performs one or more processing steps from the method 500 shown in FIG. 5 and described below in conjunction therewith.

The TaskTracker 408a proceeds to process the first partition. In the case of a Hadoop cluster, the TaskTracker 408a may apply a "map" function, a "combine" function, and/or a "reduce" function over the object metadata to generate intermediate/final output data. At line 412g, the output data may be stored in local HDFS 406.

The JobTracker 408b proceeds in a similar manner to read and process the second partition, as shown by lines 412h-412k. It should be understood that TaskTrackers 408a, 408b typically operate in parallel.

Figure 5:
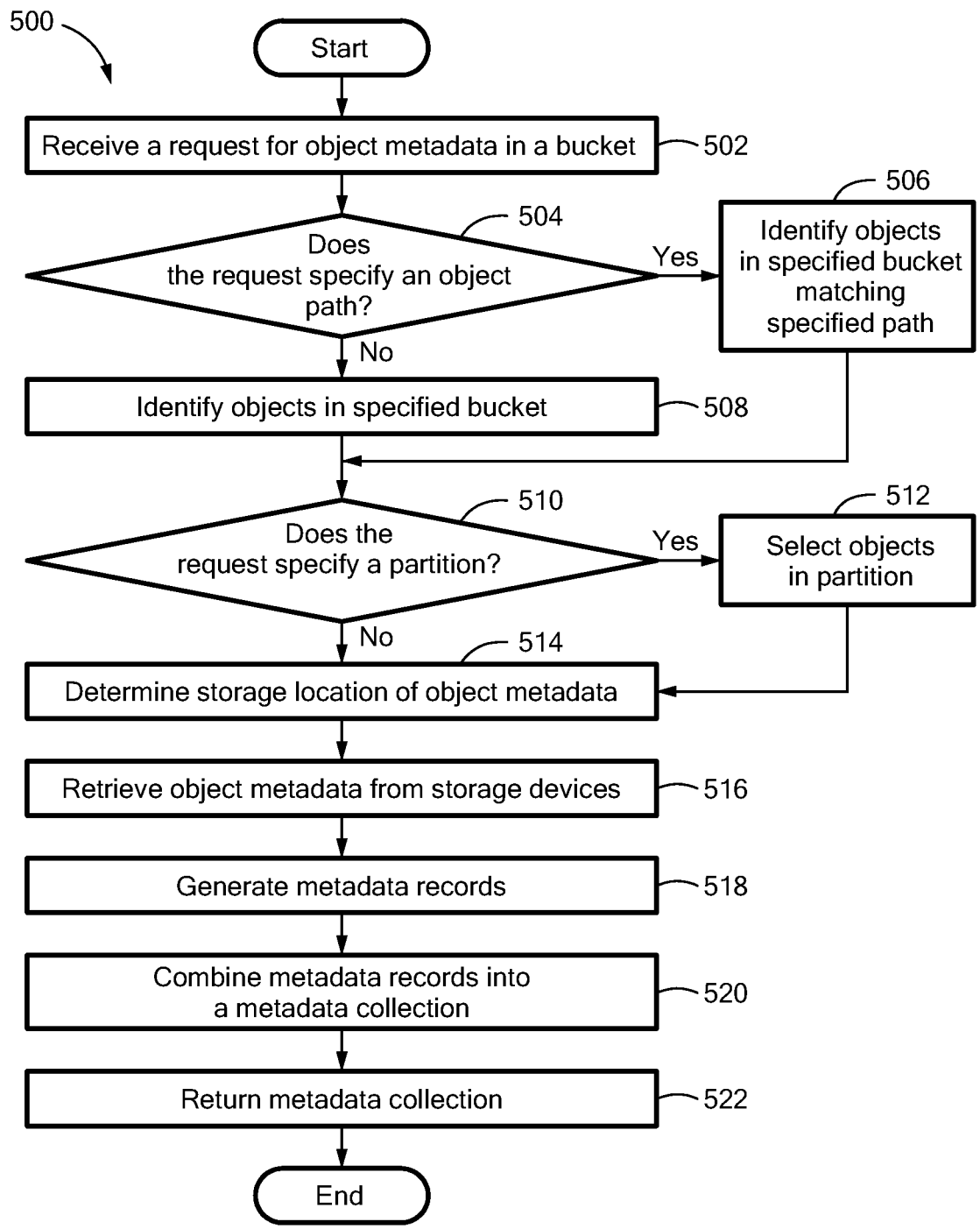
FIG. 5 is a flowchart of an illustrative method for use with the systems of FIGS. 1 and 2.

FIG. 5 is a flowchart showing illustrative processing for use within a distributed object store (e.g., distributed object store 100 of FIG. 1). Rectangular elements (typified by element 502) herein denoted "processing blocks," represent computer software instructions or groups of instructions. Diamond shaped elements (typified by element 504), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 5, an illustrative method 500 begins at block 502 where a request for object metadata is received. The request may specify a tenant id and a bucket id. The request may also specify a path (relative to the bucket) and/or a partition.

If, at block 504, a path is not specified, all objects in the bucket are identified (block 508). This may include querying the primary index to determine the object id (and any other necessary information) of all objects in the given tenant id and bucket id. In some embodiments, this includes issuing a PREFIX-GET command to distributed key/value store 104 in FIG. 1, wherein the key includes the tenant id and the bucket id.

If, at block 504, a path is specified, the objects in the specified bucket matching the specified path are identified (block 506). This may correspond to finding a single object having an object id that matches an object id specified by the path.

If, at block 510, a partition is specified, the list of objects (i.e., the objects identified at blocks 506 or 508) may be narrowed to include only objects in the specified partition (block 512).

At block 514, for each object in the list of identified/partitioned objects, the location of the object's metadata is determined. In some embodiments, object metadata location information is available within the primary index and, thus, this information may have already been determined at blocks 506 or 508.

At block 516, the object metadata is retrieved from the corresponding storage locations. This may correspond to retrieving some object metadata locally (e.g., from local storage devices) and/or retrieving object metadata from peer data service nodes, as described above in conjunction with FIGS. 1 and 4.

At block 518, a metadata record may be generated for each object, the metadata record comprising all metadata for the object. A metadata record may be generated in Apache Avro format, Apache Thrift format, Apache Parquet format, Simple Key/Value format, JSON format, Hadoop Sequence-File format, Google Protocol Buffer format, or in any other suitable format.

At block 520, the metadata records are combined to form a metadata collection. In some embodiments, the metadata collection comprises forming a Resilient Distributed Dataset (RDD). In various embodiments, the metadata record format and/or the metadata collection format is configurable. In some embodiments, these formats can be specified within the request (i.e., the request received at block 502). At block 522, the metadata collection is returned.

Figure 6:
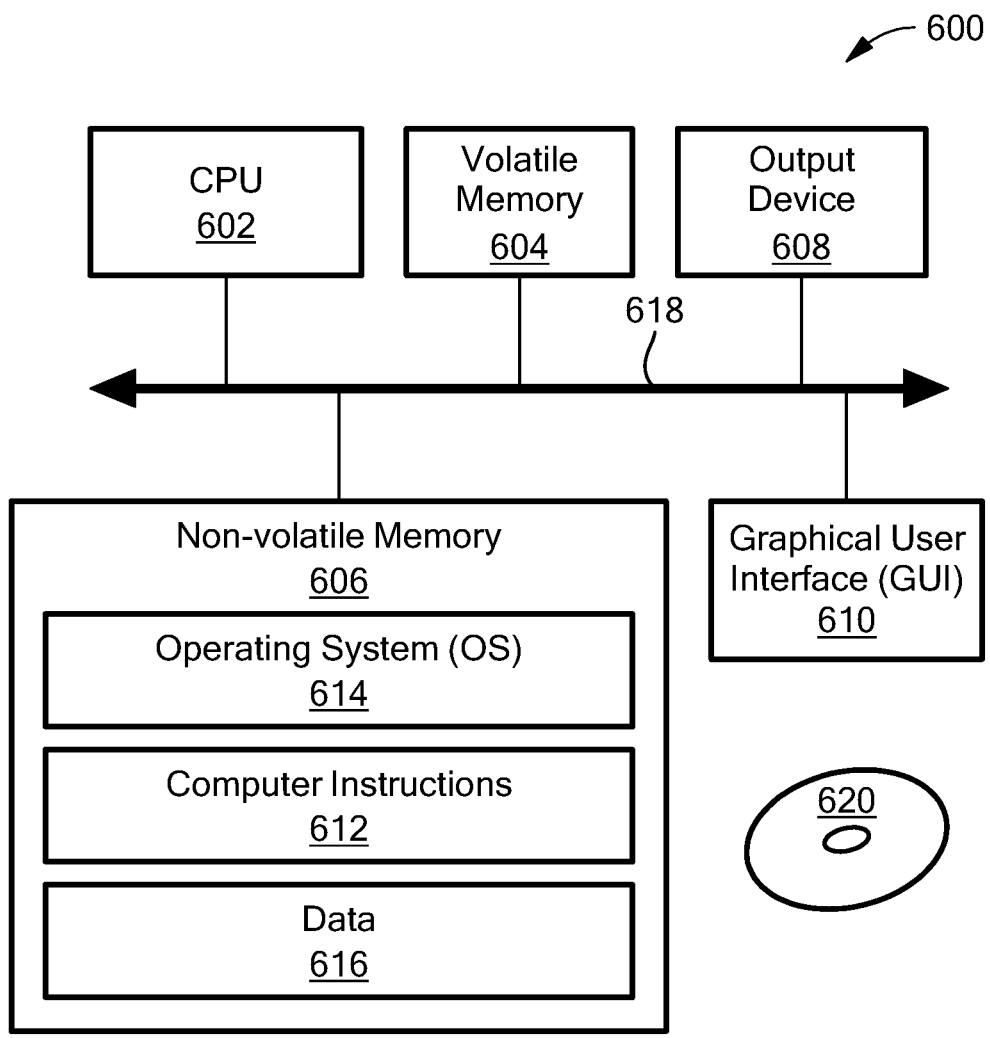
FIG. 6 is a schematic representation of an illustrative computer for use with the systems and methods of FIGS. 1, 2, 4, and 5.

FIG. 6 shows an illustrative computer or other processing device 600 that can perform at least part of the processing described herein. The computer 600 includes a processor 602, a volatile memory 604, a non-volatile memory 606 (e.g., hard disk), an output device 608 and a graphical user interface (GUI) 610 (e.g., a mouse, a keyboard, a display, for example), each of which is coupled together by a bus 618. The non-volatile memory 606 stores computer instructions 612, an operating system 614, and data 616. In one example, the computer instructions 612 are executed by the processor 602 out of volatile memory 604. In one embodiment, an article 620 comprises non-transitory computer-readable instructions.

Processing may be implemented in hardware, software, or a combination of the two. In embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that that scope of protection sought herein should not be limited to the described embodiments but rather should be limited only by the spirit and scope of the following claims.

What is claimed is:

1. A method comprising:
receiving, at a distributed object store, a data request for object metadata, the data request being received from a distributed processing system, the data request identifying one or more objects stored within the distributed object store, and the data request identifying a desired metadata collection format;
for each identified object, determining a location of corresponding object metadata stored within the distributed object store;
for each identified object, retrieving the corresponding object metadata using the determined location;
for each identified object, generating a metadata record from the corresponding object metadata;
forming, by the distributed object store, a metadata collection by combining the metadata records from the identified objects, wherein forming the metadata collection includes formatting the metadata collection to a format that is specified in the data request;
splitting, by the distributed processing system, the metadata collection into partitions, each partition including a different portion of the metadata collection;
assigning each of the partitions to a respective one of a plurality of task trackers in the distributed processing system based, at least in part, on a location of the partition within the distributed object store; and
generating, by the distributed processing system, output data based on the partitions, the output data being generated by executing a plurality of map-reduce tasks, the map-reduce tasks being executed in parallel with one another, and each of the map-reduce tasks being executed by a different one of the plurality of task trackers based on the task tracker's assigned partition,
wherein the distributed processing system is arranged to provide a user application with an interface for executing jobs that operate on object metadata within the distributed object store.

2. The method of claim 1, wherein the one or more objects are part of a same bucket.

3. The method of claim 2, wherein the data request further identifies a path where the one or more objects associated with the data request are stored.

4. The method of claim 1, wherein the assigning of each of the partitions includes assigning at least one of the partitions to a task tracker that is collocated with the partition.

5. The method of claim 1, wherein the distributed processing system includes a Hadoop cluster.

6. The method of claim 5, wherein the data request includes a Hadoop Distributed File System (HDFS) DataNode request.

7. The method of claim 5, wherein the data request includes an HDFS NameNode request identifying a bucket within the distributed object store.

8. The method of claim 5, wherein each of the metadata records is generated in one of Apache Avro format, Apache Thrift format, Apache Parquet format, Simple Key/Value format, JSON format, Hadoop SequenceFile format, or Google Protocol Buffer format.

9. The method of claim 1, wherein the distributed processing system includes an Apache Spark cluster.

10. The method of claim 9, wherein the metadata collection is formatted as a Resilient Distributed Dataset (RDD).

11. The method of claim 1, wherein the location of corresponding object metadata is determined by using a distributed key/value store.

12. The method of claim 1, wherein the user application includes a job client and the interface includes a job tracker.

13. A system comprising:
a memory; and
at least one processor operatively coupled to the memory, the at least one processor being configured to perform the operations of:
receiving, at a distributed object store, a data request for object metadata, the data request being received from a distributed processing system, the data request identifying one or more objects stored within the distributed object store, and the data request identifying a desired metadata collection format;
for each identified object, determining a location of corresponding object metadata stored within the distributed object store;
for each identified object, retrieving the corresponding object metadata using the determined location;
for each identified object, generating a metadata record from the corresponding object metadata;
forming, by the distributed object store, a metadata collection by combining the metadata records from the identified objects, wherein forming the metadata collection includes formatting the metadata collection to a format that is specified in the data request;
splitting, by the distributed processing system, the metadata collection into partitions, each partition including a different portion of the metadata collection;
assigning each of the partitions to a respective one of a plurality of task trackers in the distributed processing system based, at least in part, on a location of the partition within the distributed object store; and
generating, by the distributed processing system, output data based on the partitions, the output data being generated by executing a plurality of map-reduce tasks, the map-reduce tasks being executed in parallel with one another, and each of the map-reduce tasks executed by a different one of the plurality of task trackers based on the task tracker's assigned partition,
wherein the distributed processing system is arranged to provide a user application with an interface for executing jobs that operate on object metadata within the distributed object store.

14. The system of claim 13, wherein the one or more objects are part of a same bucket.

15. The system of claim 14, wherein the distributed processing system comprises an Apache Spark cluster.

16. The system of claim 13, wherein the distributed processing system comprises a Hadoop cluster.

17. The system of claim 16, wherein the data request is a Hadoop Distributed File System (HDFS) DataNode request.

18. The system of claim 16, wherein the data request includes a Hadoop Distributed File System (HDFS) NameNode request.

19. The system of claim 16, wherein each of the metadata records is generated in one of an Apache Thrift format, Apache Parquet format, Simple Key/Value format, JSON format, Hadoop SequenceFile format, or Google Protocol Buffer format.

* * * * *